United States Patent [19]

Drefahl

[11] Patent Number: 4,654,833

[45] Date of Patent: Mar. 31, 1987

[54] SYSTEM FOR TRANSMITTING AND RECEIVING A PERIODIC PULSE TRAIN

[75] Inventor: Dieter Drefahl, Hanau, Fed. Rep. of Germany

[73] Assignee: Honeywell GmbH, Maintal, Fed. Rep. of Germany

[21] Appl. No.: 792,426

[22] Filed: Oct. 29, 1985

[30] Foreign Application Priority Data

Oct. 31, 1984 [EP] European Pat. Off. ........ 84113123.8

[51] Int. Cl.$^4$ .............................................. G01S 7/52
[52] U.S. Cl. ...................................... 367/87; 367/138
[58] Field of Search ...................... 367/87, 98, 99, 115, 367/137, 138, 118, 135

[56] References Cited

U.S. PATENT DOCUMENTS 3,109,154 10/1963 Grada et al. .......................... 367/115
3,449,710 6/1969 Moss, Jr. ................................ 367/98

FOREIGN PATENT DOCUMENTS 0036186 3/1981 European Pat. Off. .
3031980 4/1982 Fed. Rep. of Germany .

OTHER PUBLICATIONS

*Ultrasonics*, by Winter et al, May 1975, pp. 110–112.
*IEEE Trans. on Instrumentation and Measurement*, by Chande et al, Jun. 1984, pp. 128,129.

Primary Examiner—Richard A. Farley
Attorney, Agent, or Firm—Clyde C. Blinn

[57] ABSTRACT

A method for measuring the running time of a signal transmitted by a transmitter and received by a receiver is devised, where the signal is transmitted and received by the same transducer. For transmitting the transmitter is driven by an electrical pulse train, and in receiving the received signal is converted back into an electrical signal. In receiving triggering is done on the trailing edge of the envelope of the received signal. At the transmitting side the transducer after its incitement is driven by a pulse train being in phase opposition to the original inciting signal and having a larger amplitude than the original inciting signal which results in a higher steepness of the envelope. At the receiving side the maximum amplitude is measured, and the triggering point of time is determined when the actually measured value of the envelope falls below a certain percentage value of the maximum value.

6 Claims, 10 Drawing Figures

SYSTEM FOR TRANSMITTING AND RECEIVING A PERIODIC PULSE TRAIN

BACKGROUND OF THE INVENTION

This invention relates to a system which transmits and receives electromechanically generated high frequency pulses, such as sonar and ultrasound systems, for example. More particularly, it relates to an improvement in which a system uses the amplitude of a return signal as a trigger. And still more particularly, it relates to a improved system with which the arrival time of the signal can be reliably established despite varying amounts of attenuation or distortion of the signals as they pass through the transmission medium.

Commonly, when the amplitude of a transmitted or a received signal exceeds a threshold level, this information is used as a trigger point. Due to the inertial mass of electromechanical transducers, the transmitted and received signal shows an envelope which attains its maximum value after an initial delay maintains this steady state condition for a certain time period, and then decays. In systems in which triggering occurs on the rising edge of the signal envelope, attenuation of the received signal as it passes through the transmission medium can cause a error in determining the elapsed time between transmission and receipt of the signal.

SUMMARY OF THE INVENTION

An object of the present invention is the provision of a method and apparatus to precisely measure the elapsed time between the transmission and the receipt of a series of electromechanically generated pulse signals where the signal is attenuated and distorted in the transmission path.

Briefly this invention contemplates the provision of an adaptive system in which the triggering point indicating the arrival of the received signal is on the trailing edge of the received signal envelope. The maximum amplitude of the envelope is determined and the triggering point is a predetermined percentage of the maximum amplitude, so that the triggering point in time remains constant despite variations in received signal amplitude. An adjunct of the invention includes driving the transmitted transducer with a special driving pulse train to enhance the steepness of the trailing edge signal pulse envelope.

BRIEF DESCRIPTION OF THE DRAWINGS

For a more complete understanding of the invention, reference is hereby made to the drawings, in which.

DESCRIPTION OF THE INVENTION

Figure 1A:
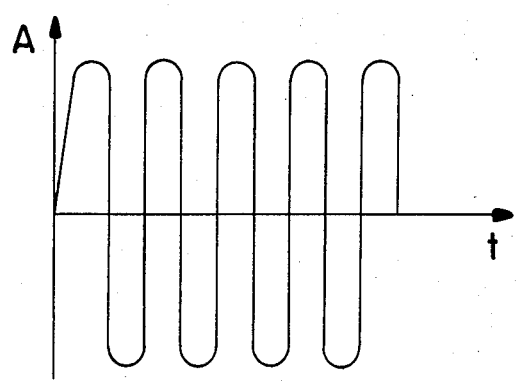
FIGS 1a and 1b are diagrams respectively showing the shape of an electromechanical transducer driving signal and the signal transmitted by said transducer.
Figure 1B:
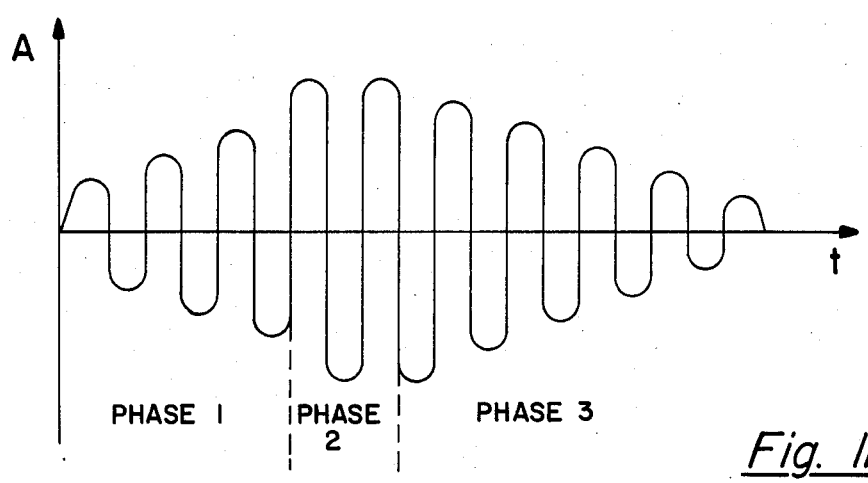

Referring now to FIGS. 1a and 1b, a transducer having a limited band width, for instance an ultrasonic transducer, driven by a sinusoidal driver pulse train according to FIG. 1a, or a rectangular pulse train, transmits a signal according to FIG. 1b. The transmitted signal has a first phase, the so-called build-up phase which is less than proportional to the electrical driving signal. A second phase, the so-called steady-state phase, is proportional to the electrical driving signal and a third phase, the so-called decay phase, is more than proportional to the electrical driving signal. Commonly the decay phase extends longer than the build-up phase.

Figure 2:
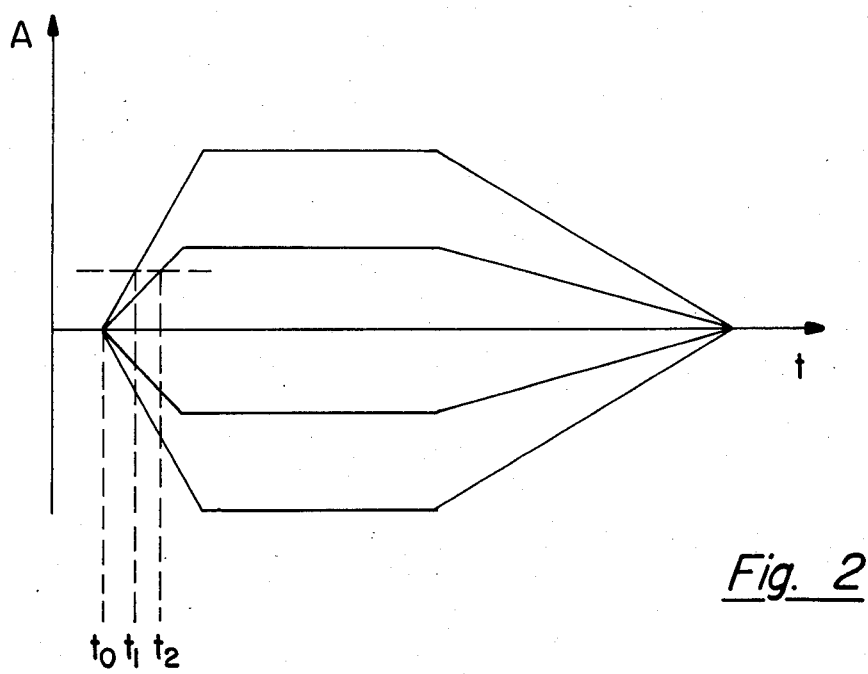
FIG. 2 is a diagram showing the envelope of two received signals differently attenuated.

Referring now to FIG. 2, the envelope of the received transducer signal shows a different attenuation as a function of the length of the transmission path and the kind of the medium through which the signal passes. If a system provides a fixed triggering level, as can be seen from FIG. 2, signal attenuation will cause a shift in time to points of time $t_1$ or $t_2$ of the triggering, respectively, which are not coincident.

Figure 3A:
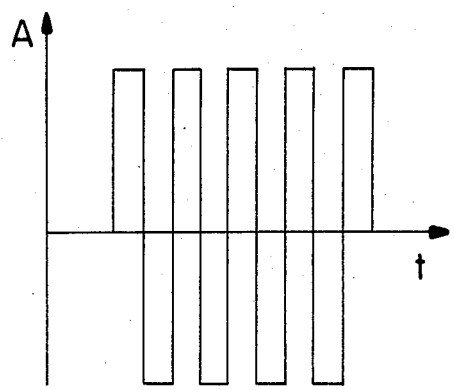
FIGS. 3a and 3b are diagrams showing the shape of a known transducer driving signal and the shape of a driving signal modified according to the invention for feeding the transducer.
Figure 3B:
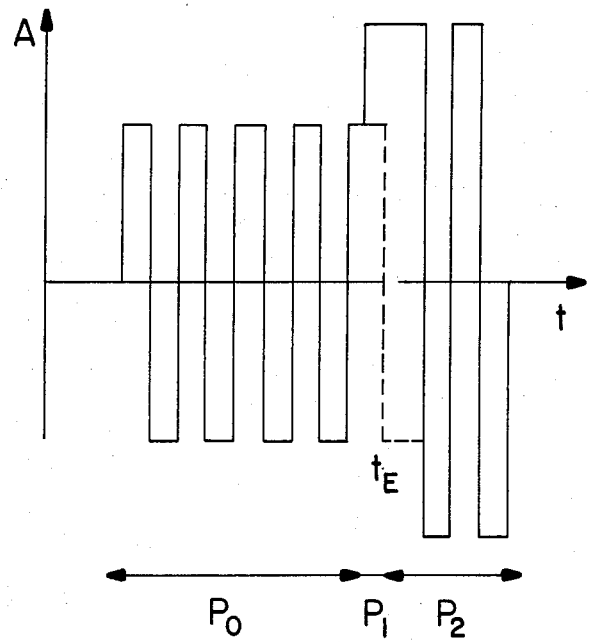
Figure 4A:
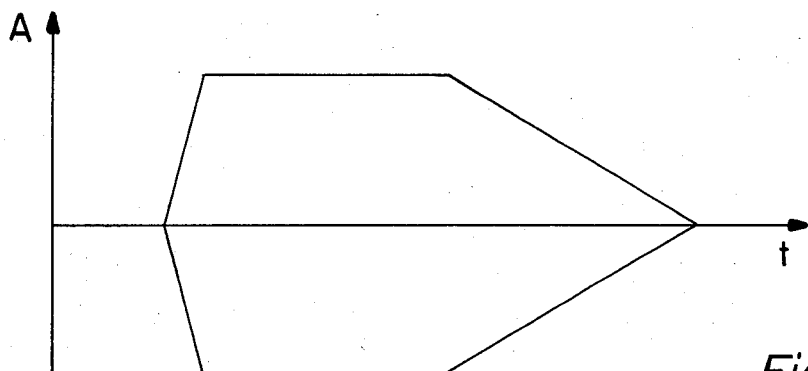
FIGS. 4a and 4b are diagrams showing the envelopes of the signals transmitted by the transducer in the use of the known driving signal and the use of the driving signal modified according to the invention.
Figure 4B:
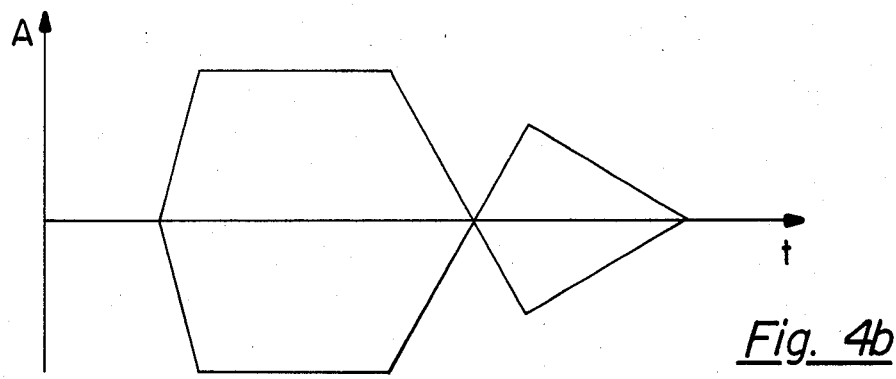

Referring now to FIGS. 3a and 3b, a modified driving pulse train according to FIG. 3b is fed to the transducer instead of the driving pulse train according to FIG. 3a. This produces a relatively steep slope during the decay phase of the envelope. Typically, the transducer is driven by a signal $P_0$ for an interval ending at time $t_E$. In accordance with the teachings of this invention, instead of simply switching-off the electrical driving signal $P_0$ at the point of time $t_E$, a pulse $P_1$ is applied to the transducer before reaching the point of time $t_E$. The pulse $P_1$ is phase-shifted by 90° with respect to the point of time $t_E$, has a pulse width which is half of $P_0$, and the same polarity as the electrical driving signal $P_0$ but a higher amplitude. Subsequently another signal $P_2$ having the amplitude of the pulse $P_1$ is produced for several periods. However, this signal $P_2$ is phase-shifted by 180° with respect to the original driving signal $P_0$. This way the transducer shows a timely accelerated attenuation and a significantly higher slope steepness of the transmitted signal, which may be taken from FIG. 4b, where the decay phase of the envelope is distinctly steeper than at the envelope achieved with the conventional driving pulse train. The fact that the envelope, according to FIG. 4b, shows a side slope is without relevance since this side slope can be electronically ignored.

The pulse $P_1$ practically may be omitted in order to achieve a simpler circuit design; its object essentially consists in reducing the load of the transducer during the shift in phase to the pulse train $P_2$. The pulse train may be implemented by conventional hardware as for instance TTL components, whereat the pulses $P_0$ are counted, at a certain count the pulse $P_1$ is produced and subsequently after switching over the phase, the pulse train $P_2$ is issued. In a simple manner such a pulse train also may be produced by an according programming of microprocessor.

Figure 5:
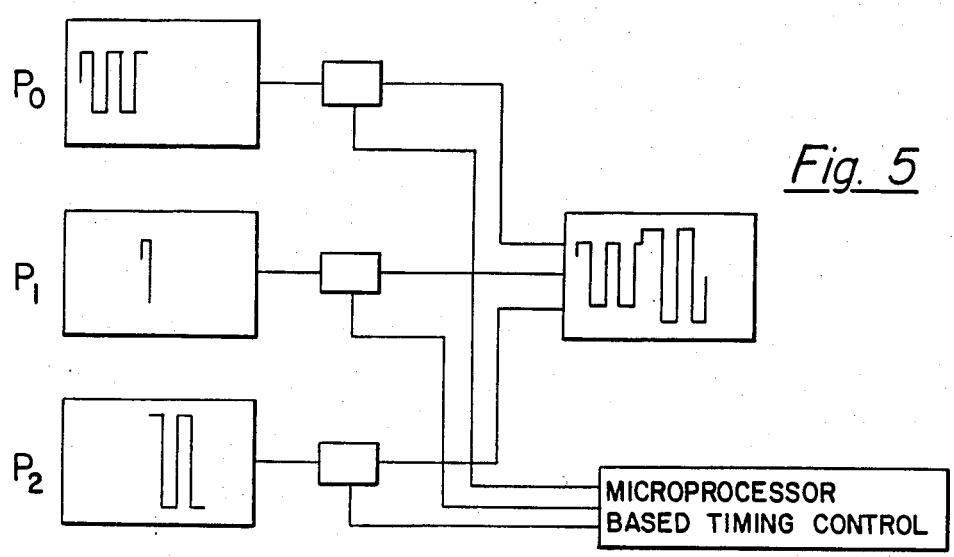
FIG. 5 is a simplified block diagram of one embodiment of a circuit for generating a transducer driving signal.

Referring now to FIG. 5, a block diagram for producing the modified driving pulse train is shown, which pulse train is indicated in FIG. 3b. Three pulse generators, $P_0$, $P_1$ and $P_2$ generate pulses $P_0$, $P_1$ and $P_2$ respectively. A microprocessor based timing control operates suitable switches to connect and disconnect the pulse generator to an output bus to form the composite pulse train.

In combination with improving steepness of the decay phase of the envelope to practically match or even exceed the steepness of the build-up phase, variations of the amplitude of the envelope may be compensated for in accordance with these further teachings of the invention relating to a adaptive trigger point.

Figure 6:
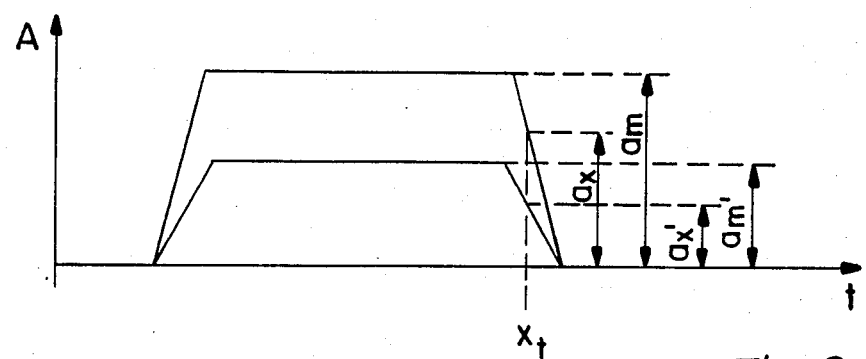
FIG. 6 is a diagram illustrating the principal according to the invention for adaptive triggering on the trailing edge of the envelope.

Referring now to FIG. 6, the amplitude $a_m$ of the envelope in the steady-state condition, i.e., during phase 2 is measured. This corresponds to the maximum signal amplitude. The triggering point in time $x_t$, then is determined according to the following condition:

$$x_t = a_x/a_m = V$$

where $a_x$ represents the instantaneous measured value and V is a predetermined value between 0 and 1. This means the triggering signal is generated if the ratio between the actual amplitude $a_x$ and the maximum amplitude $a_m$ falls below a predetermined quotient. Here the quotient V defines the signal/noise relation as well as the sensitivity of the triggering system. The closer the quotient V is chosen in the vicinity of 1, the more sensitive the system becomes not only for the information signal but also for any noise signals.

Accidental variations of the amplitude now do not result in a displacement of the triggering point of time $x_t$ as long as those variations do not appear during the time period of the received envelope which can be assumed.

Peak value detectors having different storage times may be used for determining the maximum $a_m$ and the instantaneous amplitude $a_x$. A peak value detector having a large storage time provides the signal $a_m$ (maximum amplitude), whereas a peak value detector having a very short storage time, being chosen to respond to the signal envelope, provides the actual signal $a_x$. A comparator connected to said detectors provides a triggering signal as soon as the quotient of the two values falls below a predetermined threshold value.

If the received signal shows a highly dynamic behaviour, i.e., if, for example, changing the length of the transmission path causes widely different attenuation, measures must be taken within the receiving and triggering system to prevent saturating the amplitude by the received signal. Merely limiting the signal produces, on the receiving side, a trigger pulse at a false point of time.

In accordance with a preferred embodiment of the invention, the received signal output from the transducer is coupled to the input of an amplifier having a logarithmic characteristic, with its output voltage $U_a$ showing the following relationship with respect to its input voltage $U_e$:

$$U_a = Q \cdot \lg (U_e)$$

Here Q represents the gain factor. By an appropriate choice of the characteristic, i.e., the logarithmic base, despite the widest possible variations in the amplitude of the input voltage $U_e$ the output signal $U_a$ will not override the amplifier. As will be appreciated by those skilled in the art, suitable logarithmic amplifiers are commercially available.

If a logarithmic input amplifier is used, determination of the triggering point in time change from a quotient as explained above, to a simple difference according to the following relationship:

$$b = \lg(V) = \lg(a_x) - \lg(a_m)$$

From this equation it may be seen that at the triggering point in time the logarithmic signal $\lg (a_m)$ must exceed by a predetermined value the logarithmic signal $\lg (a_x)$. This may be implemented easily by a comparator.

Figure 7:
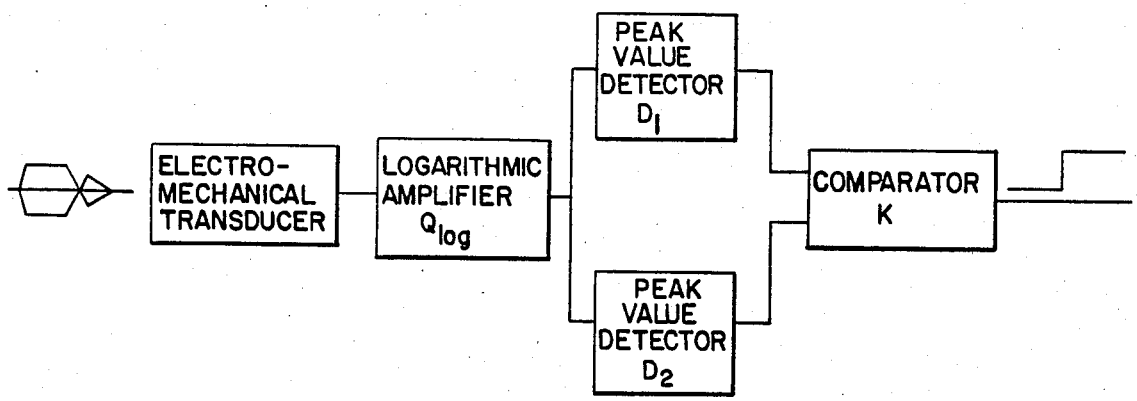
FIG. 7 is a block diagram of a receiving circuit according to the invention.

Referring now to FIG. 7, the output of the receiving transducer is coupled as an input to logarithmic amplifier $Q_{log}$. The output of $Q_{log}$ (the logarithmic amplified received signal) is coupled to a pair of peak value detectors; a peak value detector $D_1$ having a long storage time for detecting the maximum amplitude and to a peak value detector $D_2$ having a short storage time for detecting the instantaneous amplitude of the signal envelope. Subsequently, the maximum amplitude as well as the actual amplitude are applied to a comparator K, which provides a trigger output signal in the event where the difference $U_{D1} - U_{D2} > b$. Here b represents a predetermined triggering threshold.

Those skilled in the art will recognize that only the preferred embodiment of the present invention is disclosed herein and that the embodiment may be altered and modified without departing from the true spirit and scope of the invention as defined in the accompanying claims.

What is claimed is:

1. A system for transmitting and receiving electromechanically generated, high frequency pulses comprising in combination:
   an electromechanical transducer;
   means for driving said transducer with a series of high frequency electrical pulses, said series of pulses comprising a first series at one phase and a second series at a different phase;
   means for receiving said electromechanically generated pulses and generating an electrical signal in response thereto which has an envelope having an initial build-up phase, a steady-state phase, and a trailing decay phase; and
   means for generating a trigger signal when the trailing edge of said envelope falls below a predetermined value.

2. A system for transmitting and receiving electromechanically generated, high frequency pulses as in claim 1, where said means for receiving includes a logarithmic amplifier.

3. A system for transmitting and receiving electromechanically generated, high frequency pulses comprising in combination:
   an electromechanical transducer;
   means for driving said transducer with a series of high frequency electrical pulses;
   means for measuring a maximum amplitude and an instantaneous amplitude of said pulse train;
   means for receiving said electromechanically generated pulses and generating an electrical signal in response thereto which has an envelope having an initial build-up phase, a steady-state phase, and a trailing decay phase; and
   means for generating a trigger signal using a predetermined quotient of said maximum amplitude and said instantaneous amplitude upon said quotient reaching a predetermined value.

4. A system for transmitting and receiving electromechanically generated, high frequency pulses as in claim 3, where said means for receiving includes a logarithmic amplifier.

5. A system for transmitting and receiving electromechanically generated, high frequency pulses comprising in combination:

a electromechanical transducer;

means for driving said transducer with a series of high frequency electrical pulses; said high frequency pulses including a first pulse train of first amplitude and a second pulse train of a second higher amplitude phase shifted 180° from said first pulse train, means for receiving said electromechanically generated pulses and generating an electrical signal in response thereto which has an envelope having an initial build-up phase, a steady-state phase, and a trailing decay phase;

means for generating a trigger signal when the trailing edge of said envelope falls below a predetermined value.

6. A system for transmitting and receiving electromechanically generated, high frequency pulses as in claim 5, where said means for receiving includes a logarithmic amplifier.

* * * * *